United States Patent [19]
Ferber

[11] 3,732,726
[45] May 15, 1973

[54] METHOD OF AND APPARATUS FOR DETERMINING THE INTERNAL DIAMETER OF PIPES

[75] Inventor: Franz Ferber, Dusseldorf, Germany

[73] Assignee: Vereinigte Duetsche Metallwerke, Frankfurt am Main-Heddernheim, Germany

[22] Filed: Dec. 4, 1970

[21] Appl. No.: 95,056

[30] Foreign Application Priority Data

Dec. 4, 1969   Germany.................P 19 60 925.7

[52] U.S. Cl. .............73/67.5 R, 73/67 Z, 324/34 TK
[51] Int. Cl..............................................G01n 29/00
[58] Field of Search.....................73/67.2, 67.5, 67.7, 73/67.8, 67.85; 324/34; 33/17

[56] References Cited

UNITED STATES PATENTS

| | | | |
|---|---|---|---|
| 3,165,923 | 1/1965 | Lund | 73/67.8 |
| 2,355,316 | 8/1944 | Mestas | 324/34 TK |
| 3,019,636 | 2/1962 | Henry | 73/67.7 |
| 3,413,843 | 12/1968 | Kortenhoven | 73/67.85 |

FOREIGN PATENTS OR APPLICATIONS

| | | | |
|---|---|---|---|
| 603,434 | 8/1960 | Canada | 33/0.017 |
| 38/16590 | 8/1963 | Japan | 324/34 TK |

Primary Examiner—Richard C. Queisser
Assistant Examiner—Arthur E. Korkosz
Attorney—Karl F. Ross

[57] ABSTRACT

A method of and an apparatus for measuring the internal diameter of a pipe in which two inductive displacement pickups detect the external diameter of the pipe and an ultrasonic resonance system is employed for detecting the wall thickness, the pipe being axially shifted through the apparatus and being rotated about its axis concurrently. Periodic variation of the signal representing the wall thickness at a frequency equal to the angular velocity of the pipe are suppressed by filter means. The pipe may also be tested at the same time for longitudinal and transverse defects by means of ultrasonic waves.

11 Claims, 3 Drawing Figures

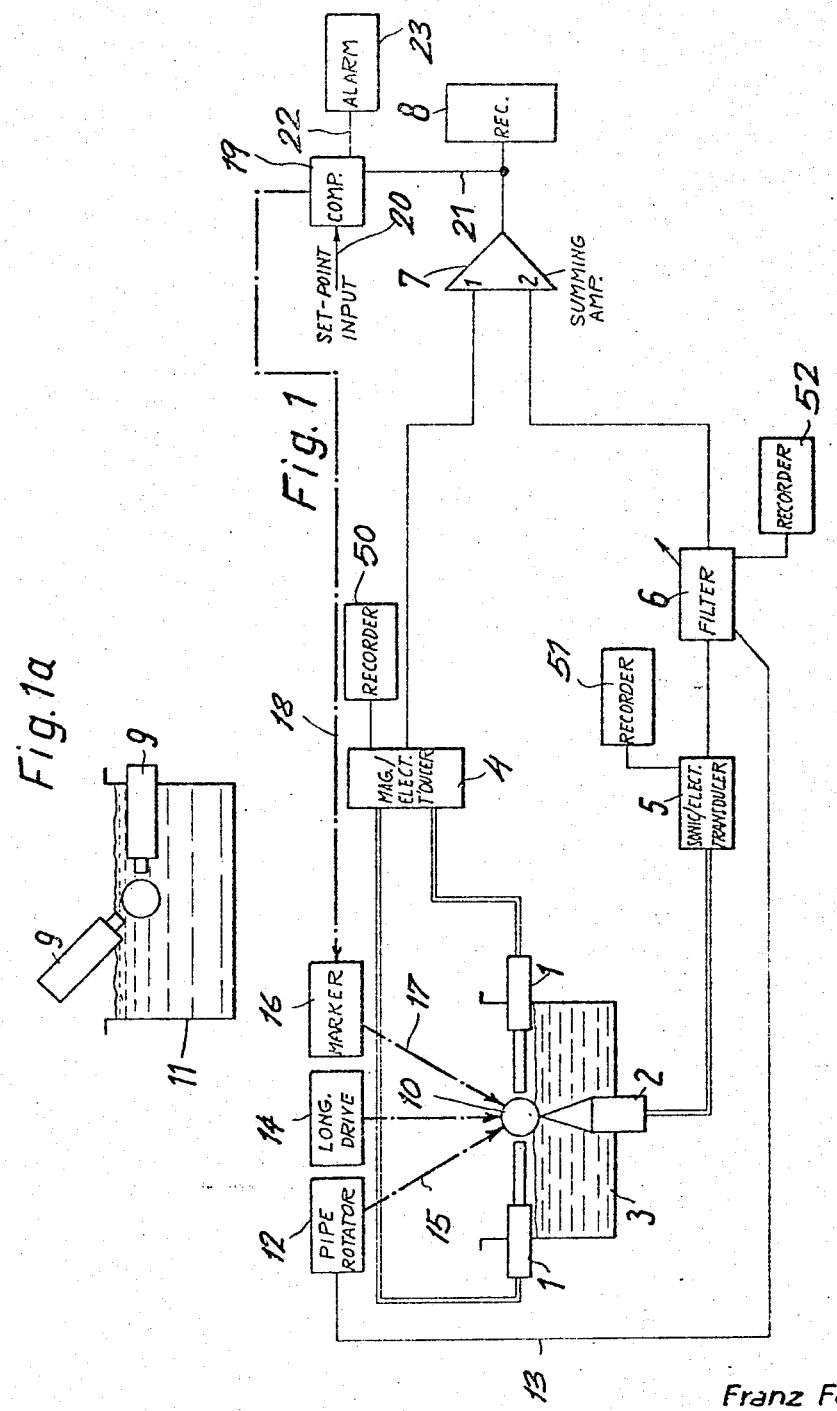

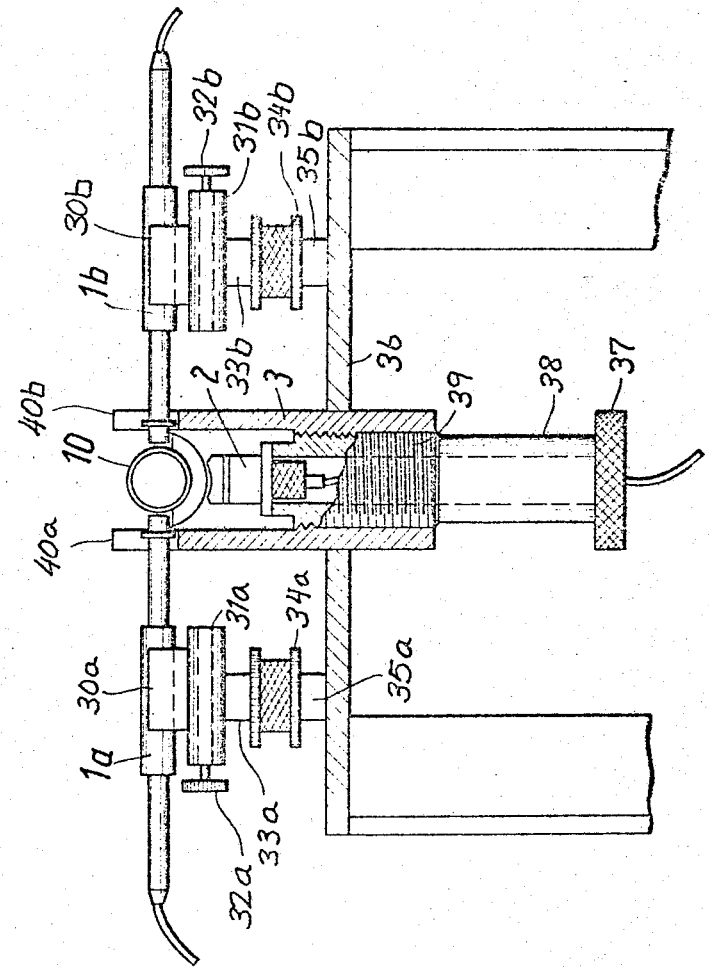

METHOD OF AND APPARATUS FOR DETERMINING THE INTERNAL DIAMETER OF PIPES

FIELD OF THE INVENTION

My present invention relates to a method of and an apparatus for determining, testing or checking the internal diameter of pipes and, more particularly, to a method of and an apparatus for the continuous testing of the inside diameter of pipes of any desired length.

BACKGROUND OF THE INVENTION

Pipes having a precision-calibrated internal diameter are made today in increasing quantities. With such pipes, it is not sufficient merely to test the internal diameter at specific points along the length of the pipe, e.g. at the ends thereof, but it is necessary to evaluate the internal diameter of the pipe throughout its length. In many cases, the internal surface of the pipe must be free of any traces caused by the sensing means which is used for detecting the internal diameter and whatever method or means for testing the inside diameter are used must be as rapidly acting, precise and automatic as possible so as to prevent the testing step from becoming a bottleneck in pipe production. Such means should be of relatively low cost and adapted to be used in conjunction with other testing or measuring equipment.

Previously known techniques for detecting the internal diameter of the pipe or checking the internal diameter to ensure conformance with predetermined specifications and at least conformity to such specifications within a limited tolerance range, have used pneumatic, mechanical or inductive sensors. All of these systems have the disadvantage, on the one hand, that the maximum length of pipe over which the test can be carried out is limited by the mechanism carrying the sensors. Particularly for testing pipes which are small in internal diameter, the apparatus cannot be made as long as it is desired. On the other hand, it is not practical to reduce the length of the pipe manufactured. Hence a significant problem has arisen in the checking of internal diameters of relatively long pipes, especially iron pipes or steel pipes.

In the known pneumatic techniques, an increase in the length of the pipe and in the volumes of the measuring circuit results in a slower response so that the test is very slow. Moreover, pneumatic-testing apparatus is highly expensive so that economical considerations, inter alia, oppose installation of a number of pneumatic sensors in an attempt to compensate for the low testing speed.

In conventional mechanical techniques, the increase in the length of the device which carries the sensor reduces the accuracy of the measurement as a result of temperature influences on the linkage used to transmit the sensor output signal to the indicating means. In the inductive techniques, which may be used to test pipes of small diameter, the inductive displacement pickups cannot be arranged directly along the diameter to be measured and a mechanical linkage is required, the linkage having the above-mentioned disadvantages.

OBJECTS OF THE INVENTION

It is an object of the invention to provide a testing method which meets the above requirements and overcomes the disadvantages of the known processes.

It is also an object of the invention to provide an improved method of and apparatus for testing, evaluating and checking the internal diameter of relatively long pipes which may have small internal diameters.

It is another object of the invention to provide an improved apparatus for testing the internal diameter of pipes which is of relatively low cost, is effective over pipe of great length, and is not influenced adversely by the inability to position detectors within the interior of the pipe.

An object of the invention resides in the provision of a method of testing the internal diameter of metal pipes with improved accuracy and speed.

SUMMARY OF THE INVENTION

These objects and others which will become apparent hereinafter are attained, in accordance with the present invention, with a method of determining the internal diameter of a pipe, checking the internal diameter of the pipe, evaluating the ability of the internal pipe diameter to remain within given tolerances, and otherwise evaluating the internal diameter of a pipe, which comprises the steps of inductively measuring the external diameter of a pipe using sensors located externally thereof, and measuring the wall thickness of the pipe by acoustic techniques, e.g. by an ultrasonic resonance technique using a pickup located at one point along the circumference of the pipe and externally thereof, the internal diameter being the difference between the outside diameter and twice the mean thickness of the pipe wall.

In carrying out the method of the present invention, the outside diameter of the pipe, i.e. its external diameter, is measured by two inductive displacement pickups while the wall thickness is measured by an ultrasonic resonance system. The pipe to be tested is rotated about its axis, i.e. is rotated past the pickups or sensors, and at the same time caused to move axially through the measuring apparatus. I may record the output signals representing the outside diameter and the wall thickness which are measured in the same plane, i.e. at right angles to the axis of the pipe, and provide filter means for suppressing the effect of wall-thickness variations which occur periodically at a frequency corresponding to the angular speed of the pipes to be tested. It will be apparent that any deviations of the actual wall thickness from the mean wall thickness will be in the form of such periodic variations which will appear at the frequency corresponding to the angular velocity of the rotated pipe. By filtering such deviations, the output of the ultrasonic resonance device constitutes the main wall thickness.

The output signals representing the measured external diameter and wall thickness can thus be continuously generated and are, according to an important feature of this invention, converted into corresponding analog data which is combined to compute the inside diameter in accordance with the following formula: $D_i = D_a - 2S_m$ wherein $D_i$ is internal diameter of the pipe, $D_a$ is the external diameter of the pipe and $S_m$ is the mean wall thickness.

The use of the term "mean wall thickness," as noted earlier, indicates that periodic variations of the wall thickness which are due to an eccentricity and are picked up during rotation of the pipe to be tested, do not enter into the output signals but are supressed by means of electric filters tuned to the known frequency of rotation of the pipes, i.e. its angular velocity.

According to still another feature, the signals are combined by conventional noninteracting electrical devices, e.g. by a summing amplifier, so that a signal which is an analog of the internal diameter of the pipe is continuously generated. This signal may merely be recorded or can be continuously compared to a set-point signal to produce an output representing a deviation of the actual signal from the reference signal. In this case, the result of the comparison can be recorded and, in the case of the deviation beyond a tolerance range, may be used to initiate an audible or visible signal or to de-energize a conveyor of the testing apparatus, or to provide a mark on the pipe to be tested.

According to another feature of the invention, means are provided, e.g. further ultrasonic resonance devices, for checking the pipe for longitudinal and transverse defect simultaneously.

It will be apparent that the present methods and the apparatus for carrying it out, have numerous advantages over conventional methods. Firstly, the internal diameter can be tested in pipe of any desired length, since it does not require the presence of any structure within the pipe. Furthermore, pipe of small diameter can be checked; again, no sensor need be accommodated within the pipe. Secondly, the method enables a high accuracy of measurement to be obtained in conjunction with a rapid response and a speedy test over the entire length of the pipe. The method is also independent of temperature and different tests can be carried out at the same time so that less total time is required for testing and evaluating the pipe. The expenditure for the testing operation itself is low and the apparatus for carrying out is of low cost. Finally, there is no need to contact the internal wall of the pipes with any sensor and there is no danger of deformation or damage to this wall.

DESCRIPTION OF THE DRAWING

The above and other objects, features and advantages of the present invention will become more readily apparent from the following description, reference being made to the accompanying drawing in which:

FIG. 1 is a block circuit diagram of a simplified representation of a system for carrying out the method according to the present invention;

FIG. 1a is a cross section showing the positioning of the ultrasonic resonance devices for longitudinal and transverse testing of the pipe; and FIG. 2 is a simplified representation of the arrangement of the sensors.

SPECIFIC DESCRIPTION

The pipe 10 to be tested is placed on a conveyor, not shown, provided with a pipe rotator 12 and a longitudinal drive 14 so that, when the measuring ranges have been set, the conveyor can be started and the pipe can rotate about its own longitudinal axis and is transversely moved past the inductive displacement to pickup 1a, 1b for measuring the outside diameter and the ultrasonic sensor for measuring the wall thickness.

As illustrated in FIG. 2, the two inductive displacement pickups 1a and 1b are disposed in a plane on opposite sides of the pipe, approximately along a diameter thereof, the plane being the plane of the paper in this Figure. The ultrasonic sensor extends perpendicularly to the pipe and lies below the latter while being arranged in a water basin 3. All three sensors are, consequently, disposed in the same plane which is at right angles to the axis of the pipe.

The ultrasonic sensors 1a and 1b, diagrammatically shown at 1a' and 1b' in FIG. 1, are mounted in brackets 30a, 30b which are displaceable horizontally upon guides 31a and 31b by screws 32a and 32b having milled heads enabling their manual displacement. Consequently, the proximity of the sensors to one another and to the axis of the pipe can be set with accuracy. The guides 31a and 31b are mounted upon uprights 33a and 33b the vertical height of which can be adjusted by a screw mechanism 34a, 34b mounted upon pedestals 35a and 35b. The system is carried by a table 36 which also supports the water bath 3 in the form of a tube having slots 40a and 40b at its upper end for clearing the sensors 1a and 1b and receiving the pipe 10. The basin 3 is adapted to be filled with water to bridge the space between the sensor 2 and the pipe 10. Hence a liquid bridge is provided between the pipe and the sensor. The ultrasonic sensor, which is of conventional construction, is carried at the upper end of a threaded spindle 39 screwed into the bottom of the basin 3 and having a shank 38 with a knurled head 37 by which the spindle may be rotated to adjust the height of the sensor 2.

Referring again to FIG. 1, it will be apparent that the output signal of the inductive displacement pickups 1a, 1b or 1a', 1b', are converted in a carrier frequency amplifier or a magnetic/electrical transducer, into a voltage at 4 which is the analog of the external diameter. At the same time, the ultrasonic sensor is fed by an ultrasonic generator (not shown but of conventional construction), which is periodically moderated in predetermined frequency ranges, the power output from the ultrasonic sensor increasing sharply at the resonance frequency. As the velocity of sound in the material of the pipe is known, the resonance frequency is a measure of the transit time of the ultrasonic waves in the pipe wall and consequently of the wall thickness. The resonance frequency is indicated by the power peak of the ultrasonic sensor and converted in a known manner in the circuit 5 into a voltage which is an analog of the wall thickness. Hence member 5 may be considered a sonic-/electrical transducer.

With exactly centric pipes having an exactly uniform wall thickness in the measuring plane throughout the circumference of the pipe, the voltage which is generated by the circuit 5 and which is an analog of the wall thickness could be directly added to the voltage which is an analog of the external diameter, provided that it is multiplied by 2 and the proper sign is used. Pipes have generally a certain eccentricity which is represented by a periodic variation of the voltage analog of the wall thickness.

While, in principle, the variation of the wall thickness (deviation from mean thickness) which is due to the eccentricity could be eliminated by providing a second ultrasonic sensor offset 180° from first, this would involve an additional expenditure and it would not be possible to provide all the required transducers in a plane which is at right angles to the pipe axis with small diameter pipe. Moreover, two ultrasonic sensors for measuring the wall thickness would have to be axially offset from the plane in which the external diameter is measured because of the limited room available around small diameter pipe and the output signals which along to a given cross-sectional plane of the pipe would not be generated at the same time. For this reason, the output signals would have to be synchronized for an accurate determination of the internal diameter and additional means would have to be provided to accomplish this synchronization. For this reason, the present invention provides, according to an important feature, for the suppression of all variations of the voltage analog of the wall thickness provided that such variations are short-time variations or are periodic variations due to the eccentricity of the pipe and resulting from rotation thereof.

Hence we provide between the block 5 and the summing amplifier 7, a filter 6 which may be adjusted as indicated at 13 in accordance with the pipe-rotation frequency to eliminate the effect of eccentricity. These results can be attained with the filter 6 because the frequency of the variation of the wall thickness, due to an eccentricity, is proportional to the speed of the pipe to be tested in rotation and because this frequency may be made higher by a factor 10 than the frequency of a periodic variation of the mean wall thickness which may be produced by the manufacturing process (e.g. cold spinning). In other words, the possible variation of the mean wall thickness will be small compared with the potential variation of the instantaneous wall thickness due to eccentricity. The filters of filter 6 are tuned to suppress variations in the voltage analog of the wall thickness at frequencies which are proportional to the speed of the pipe and pass only a voltage which is an analog of the mean wall thickness.

The voltage which is an analog of the mean wall thickness is fed to summing amplifiers 7 with multiplication by a factor of minus 2 and, therefore, is of the proper sign, together with the voltage which is an analog of the internal diameter. The noninteracting summing amplifier 7 generates a voltage which is an analog of the internal diameter of the pipe in accordance with the relationship set forth earlier. This output is continuously recorded at 8.

According to the present invention, the pipe is also subjected to an ultrasonic test for longitudinal and transverse defects simultaneously with the detection of the internal diameter. For this purpose, two additional ultrasonic sensors 9a and 9b are provided in water bath 11 (FIG. 1a) which is axially offset from the water basin 3. The same conveyor, however, moves the pipe to be tested past the internal-diameter testing sensors and then past the sensors for the defect test. The output signals obtained in both tests need not be synchronized and the electronic system for recording such defects has not been illustrated. This combination of the two testing systems has the considerable advantage that virtually all conventional pipe tests can be performed in a single operation. In addition to the test described heretofore, the method according to the present invention may be used selectively or simultaneously for testing or recording the external diameter (e.g. by recording the output obtained at 4), for testing and recording the eccentricity (e.g. by recording the output obtained at 5) and for testing and recording the mean wall thickness, e.g. by recording the output obtained at 6. The result is an universal testing method which allows the internal diameter to be tested in pipes of any desired length, which provides high accuracy together with rapid response, which is independent of temperature, which enables different tests to be carried out at the same time, which uses the equipment of low cost, and which can be performed without contact with the internal wall pipe. The output from amplifier 7 may be applied at 21 to a comparator 19 to which a set-point input 20 provided representing the desired internal diameter. In this case, the output 22 may be applied to an alarm 23 or via the line 18 to a marking device 16 which applies a mark as represented at 17 to the pipe to indicate a defective internal diameter. The recorders 50, 51 and 52 are provided at the output of the box 4, 5 and 6 to indicate recordal of the external diameter, the eccentricity, and the mean wall thickness respectively.

The improvement described and illustrated is believed to admit of many modifications within the ability of persons skilled in the art, all such modifications being considered within the spirit and scope of the invention except as limited by the appended claims.

I claim:

1. A method of continuously testing the internal diameter of a pipe, comprising the steps of:
   automatically and continuously electromagnetically measuring the external diameter of said pipe to produce an electrical-signal output proportional to said external diameter;
   automatically and continuously measuring the wall thickness of said pipe by ultrasonic resonance from the exterior thereof to produce an electrical-signal output representing said wall thickness, the electromagnetic measurement of the pipe and the ultrasonic-resonance measurement of the wall thickness of the pipe being carried out in the same plane perpendicular to the axis of the pipe;
   axially shifting said pipe concurrently with rotation thereof past said plane at which said pipe is subjected to electromagnetic and ultrasonic measurement and automatically combining said output electronically to yield a further electrical output signal representing the internal diameter of the pipe.

2. A method of continuously determining the internal diameter of a pipe, comprising the steps of:
   axially shifting said pipe concurrently with rotation thereof past a measuring station;
   measuring the external diameter of said pipe electromagnetically to produce an electrical output proportional to its external diameter during pipe rotation;
   effecting ultrasonic resonance measurement of the wall thickness of said pipe during rotation thereof to produce an electrical output representing said wall thickness, the electromagnetic measurement and the ultrasonic resonance measurement being carried out in the same plane perpendicular to the axis of said pipe, the output representing the wall thickness having a periodic variation proportional to the speed of rotation of said pipe about said axis;
   filtering such periodic variations from the last-mentioned output; and
   electrically combining said outputs subsequent to filtering to yield a further electrical output signal representing the internal diameter of said pipe.

3. The method defined in claim 2, further comprising the step of comparing the output signal representing the internal diameter with a set point signal representing the desired internal diameter and producing an alarm signal upon a deviation of said output signal from said set point signal beyond a predetermined limit.

4. The method defined in claim 2, further comprising the step of comparing the output signal representing the internal diameter of said pipe with a set-point signal representing desired internal diameter and marking said pipe upon a deviation of said outputs signal from said set signal beyond a predetermined limit.

5. The method defined in claim 4, further comprising the step of testing said pipe concurrently for longitudinal and transverse defects by means of ultrasonic waves.

6. The method defined in claim 2 wherein ultrasonic vibrations are transmitted to the pipe through a liquid medium.

7. The system for checking the internal diameter of a pipe, comprising:
 a pair of diametrically opposed inductive displacement sensors trained upon an external wall of said pipe for positioning an output signal representing the external diameter thereof;
 an ultrasonic resonance detector coplanar with said inductive displacement sensors for producing an output representing the wall thickness of said pipe;
 means for combining said outputs to produce a further output signal representing the internal diameter of the pipe;
 means forming a liquid column between said detector and said pipe for transmitting ultrasonic vibrations between them; the last-mentioned means including a basin for receiving a bath of liquid in contact with said pipe, said detector extending vertically in said basin and said sensors extending substantially horizontally above said bath;
 means for displacing said pipe longitudinally through said basin while rotating said pipe about its axis, the means for combining said outputs including a summing amplifier; and
 filter means between said summing amplifier and said detector for rejecting from the output thereof signals with a periodicity proportional to the angular velocity of said pipe.

8. The system defined in claim 7, further comprising recording means for providing a visual indication of said internal diameter and energized by the output signal of said summing amplifier.

9. The system defined in claim 8, further comprising comparator means energized by said output signal of said summing amplifier, means for applying a set point signal representing a desired internal diameter to said comparator means, and marking means responsive to said comparator means for applying a marking to the pipe upon deviation of the output signal of said summing amplifier from said set point signal beyond a predetermined level.

10. The system defined in claim 9, further comprising comparator means energized by said output signal of said summing amplifier, means for applying a set point signal representing a desired internal diameter to said comparator means, and alarming means for providing a sensored output upon deviation of the output signal of said summing amplifier from said set point signal beyond a predetermined level.

11. The system for checking the internal diameter of a pipe, comprising:
 a pair of diametrically opposed inductive displacement sensors trained upon an external wall of said pipe for producing an output signal representing the external diameter thereof;
 an ultrasonic resonance detector coplanar with said inductive displacement sensors for producing an output representing the wall thickness of said pipe;
 means forming a liquid column between said detector and said pipe for transmitting ultrasonic vibrations between them, wherein said last mentioned means is a basin for receiving a bath of liquid in contact with said pipe, said detector extending vertically in said basin and said sensors extending substantially horizontally above said bath; means for combining said outputs to produce a further output signal representing the internal diameter of the pipe; and
 means for displacing said pipe longitudinally through said basin while rotating said pipe about its axis.

* * * * *